C. N. HARRISON.
TIRE CONSTRUCTION.
APPLICATION FILED APR. 7, 1909.
997,809.
Patented July 11, 1911.
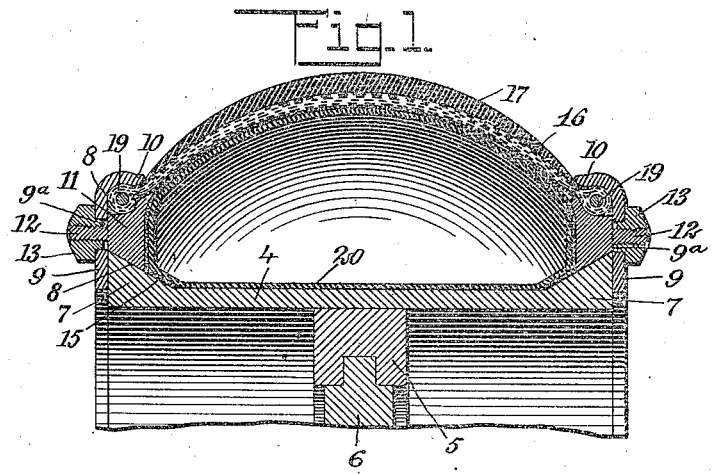
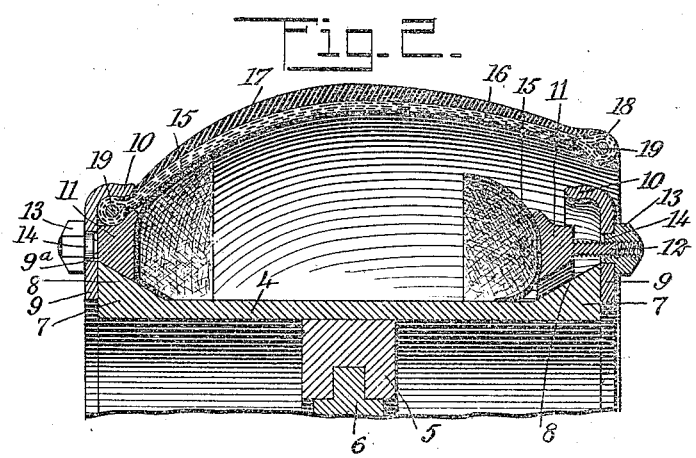
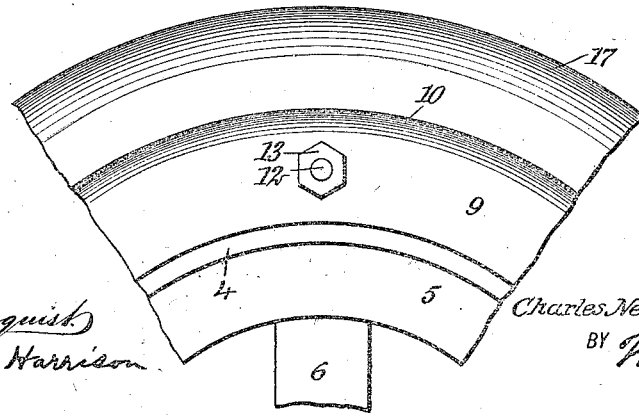
WITNESSES
INVENTOR
Charles Nelson Harrison
BY
ATTORNEYS

UNITED STATES PATENT OFFICE.

CHARLES NELSON HARRISON, OF WESTFIELD, NEW JERSEY.

TIRE CONSTRUCTION.

997,809.

Specification of Letters Patent. Patented July 11, 1911.

Application filed April 7, 1909. Serial No. 488,402.

*To all whom it may concern:*

Be it known that I, CHARLES NELSON HARRISON, a citizen of the United States, and a resident of Westfield, in the county of Union and State of New Jersey, have invented a new and Improved Tire Construction, of which the following is a full, clear, and exact description.

My invention relates to tire constructions, my more particular purpose being to increase the life of the tire, by giving the tire tread a desirable shape for the purpose of lessening the continual bending which the tread must ordinarily undergo.

My invention further relates to clamping mechanism for holding the edges of the tire tread far apart, in order to give the intervening portion of the tire tread a substantially bow-shaped section, for the purpose of carrying out the end above stated.

My invention further comprehends various improvements in tire construction, the purpose of which is to increase the general efficiency of the tire.

More particularly stated, I employ a tire containing an inner tube and also a tread portion having generally the form of a web, this tread portion being held by its outer edges and adapted, when the inner tube is inflated, to assume substantially a bow shape in cross section. By this arrangement the amount of contact surface of the outer portion of the tread where it engages the ground is greatly increased, and the bending and unbending of various portions of the tire tread are reduced to a minimum. My construction further enables the inner tube to be inflated at a relatively low pressure, thus preventing the possibility of a blow-out and decreasing the chances for a puncture, as well as decreasing the wear upon each and every part of the tire.

Reference is to be had to the accompanying drawings forming a part of this specification, in which similar characters of reference indicate corresponding parts in all the figures.

Figure 1 is a cross section through a tire and parts associated therewith, made in accordance with my invention and ready for use. Fig. 2 is a view similar to Fig. 1, with the exception that one edge of the tire has been released from the clamps which ordinarily hold it; and Fig. 3 is a fragmentary side elevation of the mechanism shown in Figs. 1 and 2.

A rim is shown at 4, a felly at 5, and spokes at 6. The rim 4 is provided with thickened portions or annular ribs 7 disposed adjacent to its opposite edges, these thickened portions being provided with beveled surfaces 8 each of a general annular form. Engaging the outer edges of the rim 4 are rings 9 each provided with a series of holes $9^a$, and further provided with an inwardly cupped flange 10.

At 11 is a ring, the cross section of which is shown in Figs. 1 and 2, this ring being beveled so as to mate the bevel 8 of the rim. Threaded stems 12 are mounted upon each ring 11 and are spaced equidistant.

Revolubly mounted upon each threaded stem 12 is a threaded nut 13 provided with a reduced portion 14 which fits into one of the adjacent holes $9^a$.

At 15 are two lining strips of canvas or other tough material, which fit against the oppositely disposed inner faces of the rings 11.

At 16 is a tire made preferably of multiple layers of canvas, and this tire is provided with an outer jacket 17 of rubber forming a tread surface, the center of this outer jacket being thicker than the edges of the same. The tire is provided with substantially cylindrical selvages 18 and extending through these selvages are selvage rings 19. The inner tube is shown at 20 and when inflated occupies the position indicated in Fig. 1.

The parts are assembled as indicated in Fig. 2. The rings 11 are drawn apart until their inner surfaces engage the annular bevels 8, the stems 12 extending outwardly through the holes $9^a$. The tire is next placed in position, the cylindrical selvages 18 being brought down upon the outer surfaces of the rings 11. The rings 9 are next placed against the outer edges of the rim 4, the flanges 10 being brought into engagement with the cylindrical selvages 18. The threaded nuts 13 are next placed upon the stems 12 and turned so as to force the rings 11 apart, and in doing this to wedge against the inwardly cupped flanges 10. This squeezes the two cylindrical selvages tightly upon the cylindrical selvages 18, as will be understood from Fig 1, and gives the tire a general bow shape in cross section, as indicated in said figure. The inner tube being inflated in the usual manner, the tire is distended and ready for use.

From the above description the operation of my device will be readily understood. The tire being secured in position and the inner tube being inflated, the wheel carrying the tire may be turned as any other vehicle wheel. In order to detach the tire, the nuts 13 are loosened and the rings 11 forced toward each other. The selvages are thus loosened and the tire is removed one edge at a time.

I lay considerable stress upon the form of the tire and particularly the form which it assumes when stretched in its normal position, as indicated in Fig. 1. The tire has a large tread surface in proportion to the total outer surface of the tire, and as the general curvature across the tire is comparatively gentle, the outer surface of the tire is thereby rendered comparatively flat so that when in use the tire presents a considerable surface upon the ground. Moreover, in this form of tire there is no need for the tire material to be bent rapidly back and forth, thereby causing the hard parts of the wheel to cut or break the tire. The lining strips 15 also protect both the inner tube and the adjacent portions of the tire from undue bending and wear and serve to avoid excessive danger to these parts.

Having thus described my invention, I claim as new and desire to secure by Letters Patent:

1. The combination of a rim provided with annular bevels, rings engaging said bevels and provided with surfaces mating the same, other rings disposed adjacent to said rim and provided with flanges projecting partially over said annular bevels, a tire provided with oppositely disposed edges, each of said edges being disposed between a flange and the ring associated therewith, and means for clamping said edges between said flanges and said rings associated therewith.

2. The combination of a rim provided with annular bevels, rings engaging said bevels and provided with surfaces mating the same, other rings disposed adjacent said rim and provided with flanges projecting partially over said annular bevels, a tire provided with oppositely-disposed enlarged edges, each of said edges being substantially cylindrical in cross section and being disposed between a flange and the ring associated therewith, stems mounted upon said rings and extending outwardly therefrom, and nuts mounted upon said stems and engaging said rim for the purpose of locking said rings rigidly in relation to said rim.

3. In combination, a rim having its edges thickened, the inner faces of the said thickened edges being beveled, a ring at each side of the rim having an inwardly extending flange above the beveled portion, a tire having its opposite edges enlarged, the said edges being adapted to be engaged by the flanges, and rings arranged between the flanges and the beveled portion, the upper edges of the said rings being concave for engaging the thickened edges of the tire and the lower edges of the said rings being beveled for coöperating with the beveled faces of the thickened portions of the rim, and means for drawing the said rings outwardly to grip the edges of the tire between the flanges and the said last-named rings.

In testimony whereof I have signed my name to this specification in the presence of two subscribing witnesses.

CHARLES NELSON HARRISON.

Witnesses:
HARVEY J. GREENWOOD,
WM. M. TOWNLEY.

---

Copies of this patent may be obtained for five cents each, by addressing the "Commissioner of Patents, Washington, D. C."